United States Patent
Goel et al.

(10) Patent No.: US 8,478,074 B2
(45) Date of Patent: Jul. 2, 2013

(54) PROVIDING MULTIPLE AND NATIVE REPRESENTATIONS OF AN IMAGE

(75) Inventors: Rajat Goel, Seattle, WA (US);
Margaret L. Goodwin, Kirkland, WA (US); Radu C. Margarint, Bothell, WA (US); Robert A. Wlodarczyk, Redmond, WA (US); Thomas W. Olsen, Issaquah, WA (US); Wei-Chung Jones Wang, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 11/482,558

(22) Filed: Jul. 7, 2006

(65) Prior Publication Data
US 2008/0008392 A1    Jan. 10, 2008

(51) Int. Cl.
*G06K 9/32* (2006.01)

(52) U.S. Cl.
USPC ........... 382/293; 382/232; 382/299; 382/291; 382/235; 382/236

(58) Field of Classification Search
USPC .................. 382/232–233, 235–236, 291, 293, 382/299
See application file for complete search history.

(56) References Cited

U.S. PATENT DOCUMENTS

| | | | |
|---|---|---|---|
| 5,802,373 A * | 9/1998 | Yates et al. ..................... | 717/139 |
| 5,809,176 A * | 9/1998 | Yajima ........................... | 382/247 |
| 6,084,598 A | 7/2000 | Chekerylla | |
| 6,501,861 B1 * | 12/2002 | Cho et al. ...................... | 382/243 |
| 6,563,964 B1 * | 5/2003 | Hallberg ........................ | 382/299 |
| 6,807,303 B1 | 10/2004 | Kim et al. | |
| 6,906,826 B1 | 6/2005 | Kuwata et al. | |
| 6,940,996 B2 | 9/2005 | Kondo et al. | |
| 6,944,357 B2 * | 9/2005 | Bossut et al. ................. | 382/298 |
| 6,959,098 B1 | 10/2005 | Alattar | |
| 7,058,239 B2 * | 6/2006 | Singh et al. ................... | 382/284 |
| 7,123,777 B2 * | 10/2006 | Rondinelli et al. ........... | 382/284 |
| 7,149,370 B2 * | 12/2006 | Willner et al. ................ | 382/305 |
| 7,190,284 B1 * | 3/2007 | Dye et al. ........................ | 341/51 |
| 7,506,253 B2 * | 3/2009 | Armstrong et al. ........... | 715/256 |
| 7,672,521 B2 * | 3/2010 | Jodra .............................. | 382/235 |
| 7,715,653 B2 * | 5/2010 | Alvarez ......................... | 382/293 |
| 7,810,025 B2 * | 10/2010 | Blair et al. .................... | 715/239 |

(Continued)

FOREIGN PATENT DOCUMENTS

CN    1538350 A    10/2004
EP    1267254 A2 *    12/2002

(Continued)

OTHER PUBLICATIONS

De Paepe et al., "Display System for Viewing Multiple Video Signals", U.S. Appl. No. 60/738,983, filed Nov. 23, 2005, p. 1 of 46 to 32 of 46, and cover p. 1/1.*

(Continued)

*Primary Examiner* — Mekonen Bekele

(57) ABSTRACT

Various embodiments are disclosed relating to providing multiple and native representations of an image. According to an example embodiment, multiple realizations of an image may be generated and provided, rather than only a single realization, for example. Also, in another embodiment, the generation and output of multiple realizations may use one or more native objects to natively perform the transforms or image processing to provide the images or realizations.

20 Claims, 6 Drawing Sheets

U.S. PATENT DOCUMENTS

| | | | |
|---|---|---|---|
| 2002/0124035 A1 | 9/2002 | Faber et al. | |
| 2003/0068098 A1* | 4/2003 | Rondinelli et al. | 382/276 |
| 2003/0095131 A1* | 5/2003 | Rondinelli | 345/582 |
| 2003/0095338 A1* | 5/2003 | Singh et al. | 359/725 |
| 2004/0030899 A1 | 2/2004 | Lee et al. | |
| 2004/0109186 A1* | 6/2004 | Shindoh et al. | 358/1.13 |
| 2004/0218820 A1 | 11/2004 | Mitchell et al. | |
| 2004/0258315 A1 | 12/2004 | Nomizu | |
| 2005/0111741 A1 | 5/2005 | Kim et al. | |
| 2005/0240880 A1* | 10/2005 | Banks et al. | 715/836 |
| 2005/0251758 A1* | 11/2005 | Cummins et al. | 715/838 |
| 2006/0232814 A1* | 10/2006 | Shao et al. | 358/1.15 |
| 2006/0233281 A1* | 10/2006 | Chen et al. | 375/299 |
| 2007/0120763 A1* | 5/2007 | De Paepe et al. | 345/1.3 |
| 2008/0144066 A1* | 6/2008 | Ferlitsch | 358/1.13 |
| 2008/0198218 A1* | 8/2008 | Liu et al. | 348/43 |
| 2009/0006348 A1* | 1/2009 | Gilula | 707/4 |

FOREIGN PATENT DOCUMENTS

| | | | |
|---|---|---|---|
| JP | 07073333 A | | 3/1995 |
| JP | 2006085414 A | | 3/2006 |
| KR | 1020000067045 A | | 11/2000 |
| KR | 1020050030699 A | | 3/2005 |
| WO | WO 2004093449 A1 * | | 10/2004 |

OTHER PUBLICATIONS

Murat Belge, Misha E. Kilmer, and Eric L. Miller,"Wavelet Domain Image Restoration with Adaptive Edge-Preserving Regularizatio", IEEE Transactions on Image Processing, Vol. 9, No. 4, April 2000, pp. 597-608.*

Photoshop—Image Size and Resolution, http://www.awdsf.com/courseware/photoshop/ps2_ImageSize_Resolution.htm p. 8, Dec. 15, 2004.*

Richardson, "ImageMagick Users Guide", retrieved from /www.imagefolio.com/mageMag ck/mageMag ck.pdf> on May 5, 2011, p. 490.*

"International Search Report", PCT/US2007/012641, Nov. 7, 2007, pp. 1-7.

Caselles, Vicent, et al., "Shape Preserving Local Histogram Modification", IEEE Transactions on Image Processing, Feb. 1999, vol. 8, http://www.iua.upf.es/~vcaselles/papers_v/ShapeLHisto.pdf.

Belge, Murat, et al., "Wavelet Domain Image Restoration with Adaptive Edge-Preserving Regularization", http://ieeexplore.ieee.org/iel5/83/18208/00841937.pdf?isNumber=.

"Symmetry and Symmetry Breaking." Stanford Encyclopedia of Philosophy, (Dec. 2, 1999).

European Search Report for application No. 07777302.6 dated May 20, 2011, 7 pages.

Richardson, "ImageMagick User's Guide", Chapters 1, 8, Appendix A, F, retrieved from <http://www.imagefolio.com/ImageMagick/ImageMagick.pdf> on May 5, 2011, 80 pages.

Thyssen, "[magick-developers] Multiple Output Formats", Nov. 2, 2004, retrieved from <http://studio.imagemagick.org/pipermail/magick-developers/2004-November/002076.html> on May 5, 2011, 7 pages.

Thyssen, "ImageMagick v6 Examples—Image File Handling", Feb. 7, 2007, retrieved from <http://replay.web.archive.org/20070207082002/http://www.imagemagick.org/Usage/filest> on May 5, 2011, 16 pages.

Notice on the First Office Action received for Chinese patent application No. 200780025383.6, dated Mar. 17, 2011, 14 pages.

"ImageMagick: Resources", ImageMagick Studio LLC, retrieved from <http://web.archive.org/web/20060701040923/http://www.imagemagick.org/script/resources.php>, Jul. 1, 2006, 5 Pages.

* cited by examiner

US 8,478,074 B2

PROVIDING MULTIPLE AND NATIVE REPRESENTATIONS OF AN IMAGE

BACKGROUND

Images may be provided in a variety of formats and resolutions. Some image processing applications allow an image to be processed, or converted to a different format, etc. This processing may typically be performed via one or more transforms performed on the image. In some cases, such image processing may generate a desired image, but may preclude further processing without loss of resolution since the original image may typically be discarded in the process. Also, such image processing techniques are typically quite limited.

SUMMARY

Various embodiments are disclosed relating to providing multiple and native representations of an image. According to an example embodiment, multiple realizations of an image may be generated and provided, rather than only a single realization, for example. Also, the generation and output of multiple realizations may use native objects to natively perform the transforms or image processing to provide the images or realizations.

According to an example embodiment, a method is provided. The method may include receiving an image, receiving an image processing command for the received image, and performing natively a plurality of transforms on the image based on the image processing command to provide one or more realizations of the image.

According to another example embodiment, a method is provided. The method may include receiving an image, receiving an image processing command for the image, and performing a plurality of transforms on the image based on the image processing command to provide a plurality of realizations of the image. Each of the plurality of realizations may include at least one transform performed natively on the image.

According to yet another example embodiment, a method is provided. The method may include receiving an image, receiving an image processing command, and determining, based on the image processing command, one or more transforms and an arrangement for the transforms to process the image and to provide multiple realizations of the image in accordance with the image processing command.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
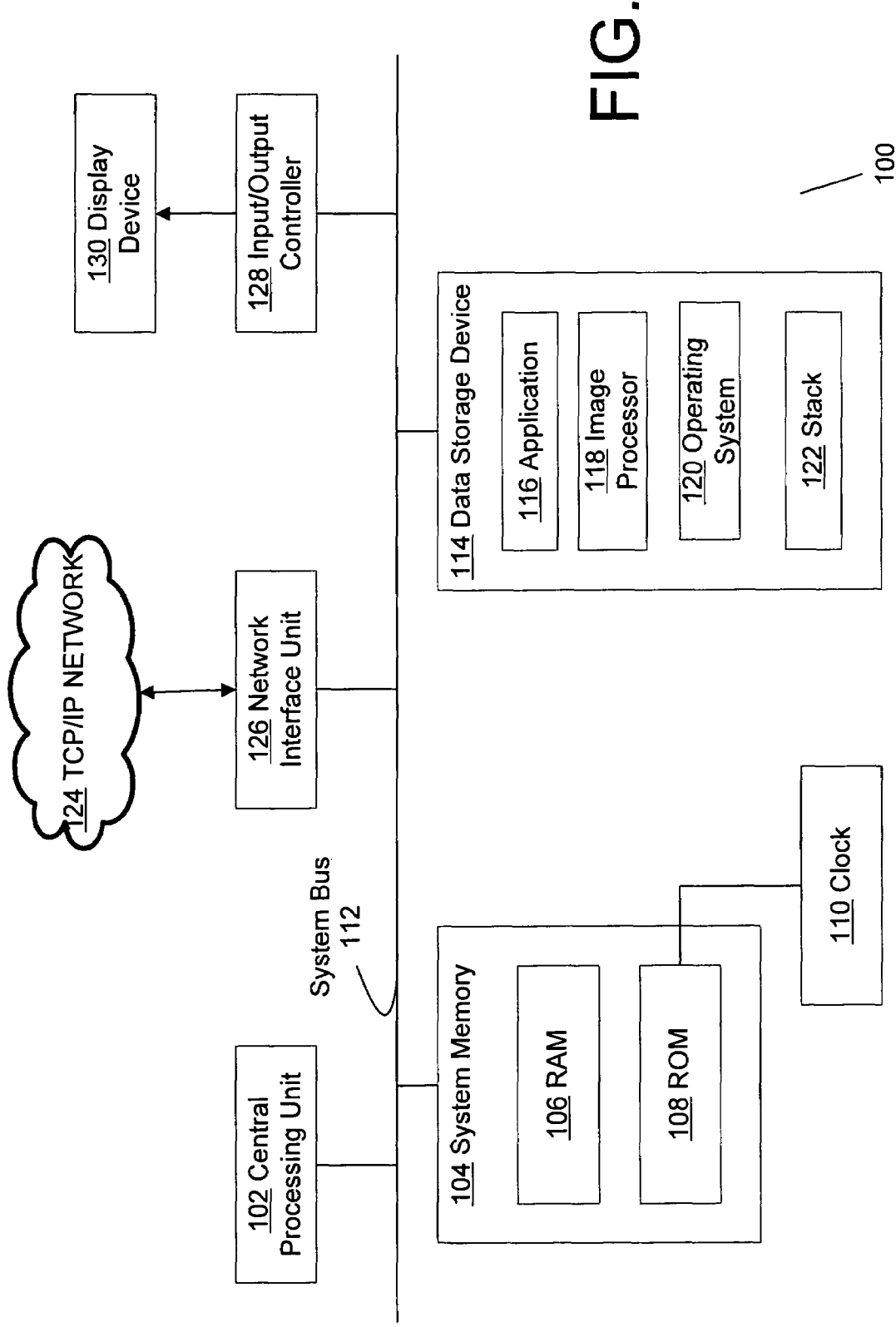
FIG. 1 is a block diagram of a computing system according to an example embodiment.

Referring to the Figures in which like numerals indicate like elements, FIG. 1 is a block diagram of a computing system 100 according to an example embodiment. Various embodiments may be practiced or implemented within computing system 100 or other computing system, according to an example embodiment. Computing system 100 may include, for example, a laptop computer, a desktop computer, a personal computer (PC), a server, a network device (e.g., switch, router), cellular telephone, personal digital assistant (PDA), gaming device, handheld communications device, or other computing device. These are merely a few examples, and the various embodiments are not limited thereto.

The system 100 may include a central processing unit ("CPU") 102, a system memory 104 including a random access memory 106 ("RAM") and a read-only memory 108 ("ROM"). The CPU 102 may interpret instructions and process data in computer applications. For example, the CPU 102 may be a microprocessor and include a number of integrated circuits, and may execute software or instructions and provide overall control to computing system 100. The RAM 106 may allow data stored on the RAM to be accessed in any order, the system 100 may also for example write to and read from the RAM 106. For example, a data file may be stored on the RAM 106 at a time X, and at a time Y the data file may be read from the RAM 106. The ROM 108 may contain data or systems that may be read from the ROM 108 by the system 100 (as opposed to the RAM 106 which generally may be written to or read by the system 100). For example the ROM 108 may comprise a basic input/output system (BIOS) software code to be run by the system 100 when the system 100 is first powered on. The ROM 108 may also for example be coupled to a clock 110. The clock 110, for example, may provide the time to the system 100 through the ROM 108.

The system 100 may also include an input/output controller 128 and a display device 130. Input/output (I/O) controller 128 may interface to one or more I/O devices, such as display device 130. The input/output controller 128 may, for example, provide output to the display device 130. The display device 130 may be a device configured to receive data from the input/output controller 128 and provide or display the data to a user. Although not shown, the input/output controller 128 may also be coupled to a variety of input devices, such as a keyboard, mouse, joystick, or any other input device configured to provide input to the system 100.

The system 100 may also include a data storage device 114 to store data, instructions or other information. Data storage device 114 may be, for example, a hard disk drive that stores data on a magnetic surface, a CD-ROM, or any other available media storage device accessible by the system 100.

By way of example, and not limitation, data storage device 114 may include any computer-readable media. The computer readable media may, for example, include computer storage media and communication media. Computer storage media may include media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

One or more software programs or blocks may be stored in data storage device 114, such as an application 116, an image processor 118, an operating system 120, and a stack 122. Application 116 may be a web browser, word processor, a multimedia application, or other application. For example, application 116 may, for example, be an imaging application configured to send images and image processing (or process) commands and receive processed images including one or more realizations. The application 116 may send and receive images, process commands, processed images, and/or realizations based upon a user's input, for example. For example, the application 116 may, receive an image from a digital camera. Then for example, the application 116 may send the image to the image processor 118 to perform a transform, such as a flip/rotate transform, after which the image processor 118 may return to the application 116 a processed image 214 including a realization 216.

The image processor 118 may be a program that performs image processing. For example, image processor 118 may be an application configured to receive an image and an image processing command and may perform one or more transforms on the received image based on the command to generate one or more realizations of the image. For example, the image processor 118 may receive an image and a command to rotate the image. The image processor 118 may then perform the rotation and output the processed image, including the rotated image realization.

The operating system 120 may be a software program that manages the hardware and software of the system 100, and may be any type of operating system. For example, the operating system may be Microsoft Windows, Linux, etc. The stack 122 may be a temporary data structure used to store data from the data storage device 114. For example, the stack may store the image and corresponding processing commands from the application 116 to the image processor 118, the image processor 118 may then access the items stored on the stack 122.

According to an example embodiment the system 100 may operate in a networked environment using logical connections to communicate with remote computers through a network, such as a TCP/IP network 124, as an example. For example, the TCP/IP network 124 may be the Internet, a corporate intranet, a local area network, a wireless network, a wide area network, and/or any other network. The system 100 may communicate to the TCP/IP network 124 through a network interface unit 126. The network interface unit 126 may be a device and/or software program configured to allow the system 100 to communicate with the TCP/IP network 124. For example, the network interface unit 126 may be a network card, network interface controller (NIC), a modem, or any other communication enabling device.

A system bus 112 may be coupled to the CPU 102, the system memory 104, data storage device 114, network interface unit 126, and input/output controller 128. The system bus 112 may allow transfer of data between two or more system components. For example the system bus 112 may allow for transfer of data to and from the system memory 104 and CPU 102. The system bus 112 may also, for example, couple other parts of the system 100 together as well, such as the data storage device 114 to the input/output controller 128.

Figure 2:
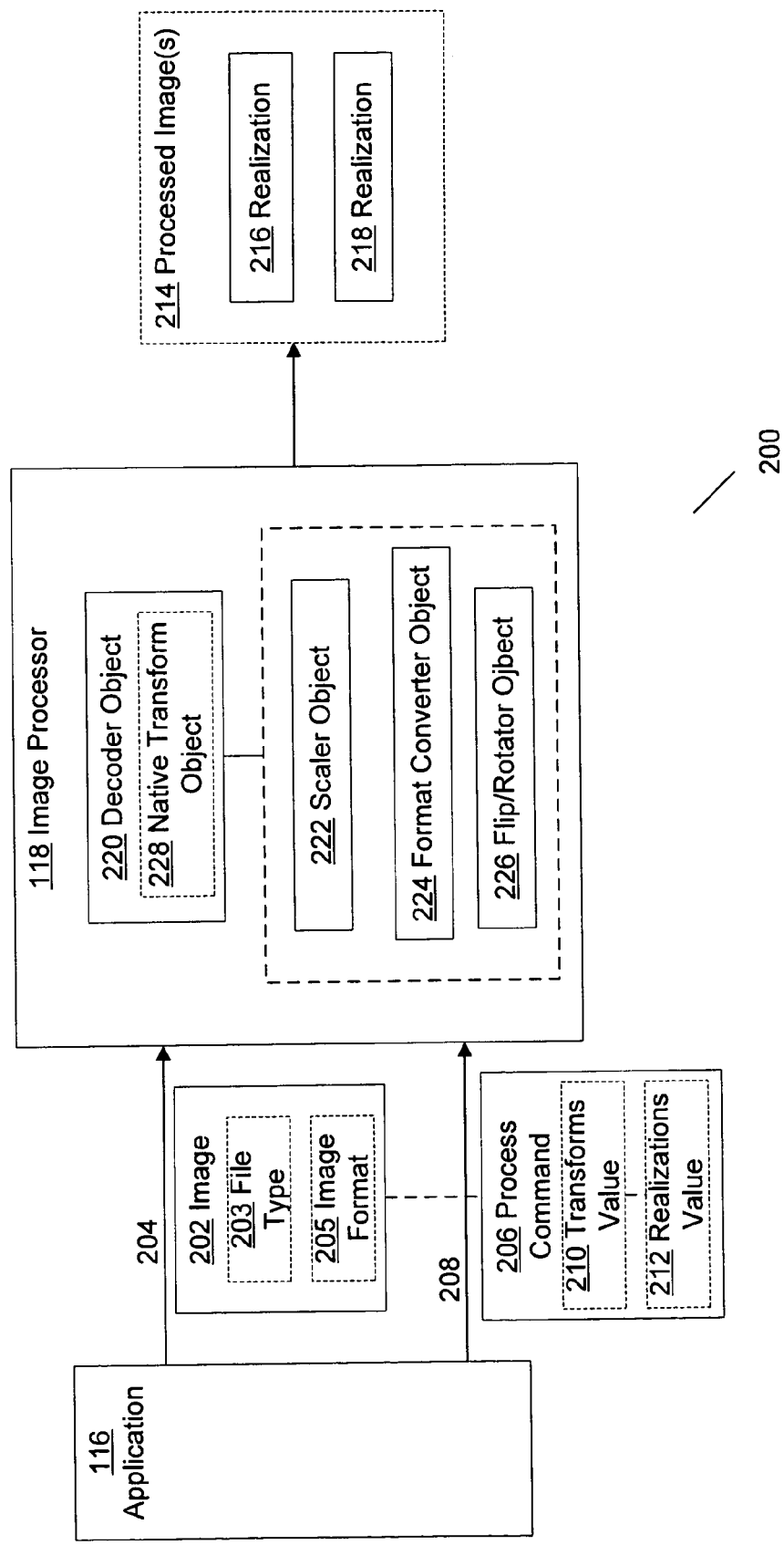
FIG. 2 is a block diagram of a system according to another example embodiment.

FIG. 2 is a block diagram of a system 200 according to another example embodiment. System 200 may include an application 116 and an image processor 118, as described above. For example, the application 116 may be configured to provide an image 202 via line 204 and an image process (or image processing) command 206 via line 208 to the image processor 118. The image 202 and process command 206 may be provided, for example, by application 116 passing a command and one or more parameters to image processor 118.

Image processor 118 may be a software program and/or device configured to receive the image 202 and the process command 206. Image processor 118 may perform the process command 206 on the image 202 by, for example, instantiating a decoder object 220 and one or more transform objects, such as transform objects 222, 224, 226, 228, and provide one or more processed image(s) 214 including one or more realizations (216, 218) of the image. In this manner, image processor 118 may process the image 202 based on the process command 206 to provide one or more realizations of the image, such as realizations 216, 218, as examples.

The image 202 may be in a file of a particular file type 203. The file type 203 may be a file format or a way of compressing image data and may be any acceptable file type, such as a raster graphics file type, a digital file type, or other file type. For example, the file type 203 may be a JPEG, Graphics Interchange Format (GIF), Portable Network Graphics (PNG), Raw (or uncoded), or any other file type. The image 202 may be in a file including any acceptable file type 203. The image 202 may also include one or multiple images. Each image may also include an image (or pixel) format 205. For example, the image format 205 may be in an RGB, CMYK, YCbCr, or any other color space or pixel format.

The process command 206 may be a single process command 206 or multiple process commands. The process command 206 may include, for example, a transforms value 210, a realizations value 212, or both. The process command 206 may be associated with the image 202. The transforms value 210 may, for example, indicate which transform(s) to perform on the image, and may also indicate a specified order of application of the transform(s). A transform may be any potential modification or processing that may be performed on the image 202, including but not limited to, for example, a scalar transform, a format converter transform, and/or a flip/rotator transform. Additional and/or different transforms may also be used.

The realizations value 212 may identify the number of realizations, and/or may identify the realizations and/or processed image(s) to be output by the image processor 118. Realizations 216, 218 may each be a version of the image 202 before or after the application of one or more transforms to the image 202. The realizations value 212 may, for example, also indicate which transforms to perform for which realizations 216, 218, and may also identify the order in which to perform the transforms. The processed image(s) 214 may be one or more images output from the image processor 118, before or after the application of one or more transforms to the image 202. Each processed image(s) 214 may include one or more realizations 216, 218, or may be referred to as a realization.

For example, application 116 may send an image 202 with a format 205 of YCbCr to the image processor 118. The application 116 may also send a process command 206 to the image processor 118. The process command 206 may include for example, a transforms value 210 and a realizations value 212, although this is merely an example, and the embodiments are not limited thereto. The transforms value 212 may identify a scaler transform, a format converter transform and a flip/rotator transform, and/or other transform, to be performed on the image. The realizations value 212 may, for example, indicate that realization 216 should be generated by scaling the received image 202 (e.g., by 30%), and realization 218 should be generated by format converting (e.g., YCbCr to RGB) and then rotating the received image 202 (e.g., by 90 degrees), as an example. These are merely some examples, and the various embodiments are not limited thereto. The image processor 118, then for example, may perform the specified transforms by instantiating the scaler object 222, the format converter object 224 and/or the flip/rotator object 226 to process the image and output the processed image(s) 214 including the two realizations 216, 218.

The image processor 118 may include a decoder object 220 and a number of transform objects, such as, for example, a scaler object 222, a format converter object 224 and/or a flip/rotator object 226.

The decoder object 220 may decode and/or decompress the image 202 from its current file type 203 state so the image processor 118 or one or more transform objects may perform transformations on the image 202, for example.

The scaler object 222 may be configured to perform a scaler transform on the image 202. The scaler object 222 (or scaler transform) may scale an image, which may include increasing or decreasing the size of an image 202, either in whole or in part. The scaling performed by scaler object 222 may be performed without changing the resolution of the image, or it may include changing or altering the resolution of the image. For example the transforms value 210 may indicate performing a scaler transform to increase the size of the image 202 by 50%. In response to such an image process command, image processor 118 and/or scaler object 222 may typically scale the image by 50%, to generate the 50% scaled realization.

The format converter object 224 may change the format 205 of the received image 202, or convert the format 205 of the image 202 to a different format. For example, the image 202 may be provided to the image processor 118 with a format of RGB, and the transforms value 210 may identify a format converter transform to convert the image into a CMYK. In response to such a process command, the image processor 118 and/or format converter object 224 of image processor 118 may convert the format 205 of received image 202 from RGB to CMYK, for example.

The flip/rotator object 226 may flip or rotate the image 202. The flip/rotator object 226 (or transform) may flip the image 202 upside-down or right-to-left or it may rotate the image 202 a number of degrees. For example the transform value 210 may identify a flip/rotator transform to flip the image 202 upside down or to rotate the image 30 degrees counter-clockwise. In response to such an image process command, the image processor 118 and/or flip/rotator object 226 may then flip or rotate the image 202 as requested.

As described above, decoder object 220 may decode a received image. In addition to being configured to decode an image 202, the decoder object 220 may also include a native transform object 228. The native transform object 228 may include any transform object (or image processing object) that may be performed natively, such as a native scaler object, a native format converter object, and/or a native flip/rotator object, as examples. The native transform object 228 may perform any transform or combination of transforms natively within the decoder object 220, if the native transform object 228 includes the transform capability. In an example embodiment, native transform object 228 of decoder object 220 may perform one or more native transforms on the image at the same time or at approximately the same time that decoder object 220 decodes the received image 202. By performing the transform(s) natively within decoder object 220 or native transform object 228, this may, for example, typically include performing the requested transform on the image without resampling the received image. This may, in some cases, provide improved image quality as compared to a non-native transform, where resampling or down-sampling on the image may occur, for example.

A native transform object 228 may allow one or more transforms to be applied to the image natively, e.g., without the need to resample or down sample the image. Thus, in some cases, native transforms may advantageously provide improved image quality or avoid loss of image quality, for example. The native transform object 228 may include any number of transform objects. For example, the native transform object 228 may include a native scaler object, a native format converter object and/or a native flip/rotator object so that all requested transforms may be performed natively on the image 202.

In some cases, after receiving a process command 206 from application 116, decoder object 220 may instantiate one or more transform objects to perform the requested processing on the image 202. If a native transform object 228 is available to perform the requested transform or processing, then the image may be processed natively using the native object. Otherwise, if the requested transform is not available as a native transform, then an instantiated transform object, e.g., objects 222, 224 or 226, may perform (e.g., non-native) processing on the image, which in some cases may include re-sampling the image. Thus, some (or even all) of the requested transforms may be performed on an image natively, while other transforms (or even all) may be subsequently performed non-natively by other transform objects, for example.

In an example embodiment, a received process command 206 may request two transforms to be performed on an image 202, such as scaling by 25%, and converting from image format YCbCr to RGB. In this example, a decoder object 220 may be instantiated by image processor 118. Also, based on the process command 206, a scaler object and a format converter object may be instantiated and associated with the decoder object 220. In this example, scaling may be performed natively by native transform objects 228, while the requested format conversion from YCbCr to RGB may not be available natively. This is merely an example. Thus, upon receiving the image, decoder object 220 may decode the image and native transform object 228 may natively scale the image by 25% as requested. Next, the decoded and scaled image may be passed to the format converter object 224 where the image may be converted to RGB format, for example, and output as a realization of the image (decoded, scaled and format converted).

In another example embodiment, image processor 118 may output multiple realizations of an image. Each realization may be a different version of the image, e.g., where different transforms may have been performed on the image for each realization. For example, image processor 118 may output a first image realization that may be the original image 202, a second realization that may be the image 202 after being decoded, and a third image after being decoded, scaled by 25% and converted to RGB. In an example embodiment, one or more (or even all) of the transforms in this example may have been performed natively. This is merely an example. The process command 206 may identify the one or more realizations to be provided or generated, e.g., via the realizations value(s) 212, for example.

FIG. 3A is a diagram of a system 300A in which an image is processed to provide multiple realizations according to an example embodiment. System 300A may include an image 202 and a process command 206 being received by a decoder object 220. The image 202 may be in a file and may include any image or several images in any image format 205, as discussed above. The process command 206 as discussed above may include a transforms value and/or a realizations value, for example, or other information identifying one or more image realizations to be provided or generated. The process command 206 may indicate for example how many realizations to output of the image 202, which transform(s) to perform for each realization and in what order to perform the transform(s) to generate the realizations, for example.

Decoder object 220 may include an image memory 302. Decoder object 220 may be coupled to or associated with a scaler object 222, a format converter object 224, and/or a flip/rotator object 226. As discussed above, the decoder object 220 may decode or decompress a received image 202 as discussed above. Also, the scaler object 222 may scale an image. The format converter object 224 may convert the format 205 of the image to a different format, and the flip/rotator object 226 may flip or rotate an image. Other transform objects may be provided.

According to an example embodiment, image processor 118 may output one or more image realizations, such as realizations 304A, 304B, 304C and 304D, for example. Each realization may comprise the image 202 after having zero or more transforms performed on it. In the case of being output after zero transforms, this may be outputting the original received image 202. The image memory 302, of the decoder object 220, may store the received image 202 so the original image 202 may be available even after a transform is performed on it. Image memory 302 may, for example, store one or more intermediate stage realizations after one or more of the transforms are performed on the image. These intermediate stage realizations may be output as realizations, and/or may be further processed by other transforms for output as other realizations. In an example embodiment, the image memory 302 may be part of the decoder object 220, or may be provided within system memory 104 (e.g., within RAM 106, FIG. 1, for example.

For example, the original image 202 may be of a dog or other object, and the process command may comprise a first realization to scale the size of the image to 150% of the original size, and a second realization to flip the image upside down. Then, the image memory 302 may store the original dog image 202 so that after the image is scaled to 150% for the first realization, the second realization may still use the original image, 202 as stored in the image memory 302, in order to flip the original image 202 upside down. The original image stored in image memory 302 may be used to output a realization of the original image. In an example embodiment, the image memory 302 may also store state information identifying the state of the image 202 being processed and/or an intermediate state realization after one or more transforms are performed on the image. For example, in providing the second realization 304B, the image memory 302 may store the image or image state information after the scaler object 222 performs the scaler transform. Then, for example, the format converter object 224 may retrieve the image state information from the image memory 302 to perform the format converter transform on the scaled imaged.

The image processing performed by system 300A in FIG. 3A will now be briefly described. The decoder object 220 may typically be provided first, in an example embodiment. After the decoder object 220, one or more transform objects, such as the scaler object 222, the format converter object 224, and the flip/rotator object 226 of the system 300A may be organized in series, in parallel, or in a combination of both based on the process command 206, such as based on a realizations value 212 of the process command 206. For example, as shown in the example of FIG. 3A, the decoder object 220 may receive an image 202 of a dog in an RGB format. The decoder object 220 may also receive a process command 206 associated with the image 202, wherein the process command may 206 include a command to produce four realizations of the image, for example. The first requested realization 304A may include the image 202 that has been decoded by decoder object, and scaled (e.g., by 50%) by scaler object. The second requested realization 304B may include the image that has been decoded by a decoder object, scaled (e.g., by 50%) by scaler object, and then format converted (e.g., from RGB to CMYK) by format converter object. The third requested realization 304C may include the image that has been decoded by decoder object and then rotated (e.g., 90 degrees) by flip/rotator object. And the fourth realization 304D may include an image 202 that has been decoded by decoder object, rotated (e.g., by 30 degrees) by flip/rotator object, and format converted (e.g., from RGB to CMYK) by format converter object, e.g., in any order.

Upon receiving the image 202 for example, the decoder object 220 may store a copy of the original image 202 in the image memory 302, for further processing and/or for possible output as an unprocessed realization. In the example embodiment illustrated in FIG. 3A, the decoder object 220 of system 300A does not contain, for example, a native transform object 228 for the scaler object, format converter object, or the flip/rotator object as requested by the process command. Therefore, in this example, the requested transforms may be performed by non-native transform objects.

Upon receiving the image 202, a decoder object 220 may be instantiated to perform the decoding of the received image. Also, one or more additional objects may be instantiated and coupled to or associated with the decoder object 220 based on the process command 206. This may include determining one or more objects and determining an arrangement, e.g., series and/or parallel arrangement and/or order, for the objects to process the image to generate the requested image realizations according to the process command. For example, as shown in FIG. 3A, this may include determining that scaler object 222 and format converter object 224 should be provided in series to produce the second realization 304B, while placing flip/rotator object 226 in parallel (to objects used to generate the second realization) to generate the third realization 304C, as an example. After the decoder object 220 natively decodes the image 202, the four example realizations may be generated.

As noted, for the second realization 304B in FIG. 3A, the decoded image may be scaled by scaler object 222 and format converted by format converter object 224 to produce second realization 304B. Objects 222 and 224 may be, for example, non-native transforms. For example, the non-native transforms may involve resampling or even down-sampling the decoded image, for example. In another example embodiment, both scaler object 222 and format converter object 224 may be available natively, and therefore may be performed natively within decoder object 220. Note that an intermediate stage realization may be stored after the decoded image is scaled by scaler object 222. This intermediate stage realization output from scaler object 222 may then be output as the first realization 304A.

To produce the third realization 304C for example, the decoded image, as stored in the image memory 302, may be rotated by flip/rotator object 226 to generate third realization 304C. Finally, to produce the fourth realization 304D the decoded image stored in the image memory 302 may be format converted by format converter object 224 first (e.g., as opposed to later as in the second realization 304B) and then rotated by flip/rotator object 226 to generate the fourth realization 308D. In another example embodiment, all the objects used to generate the fourth realization 304D, including format converter object 224, flip/rotator object 226, may be provided natively, meaning in an example embodiment that native processing may be performed by decoder object 220 to generate the fourth realization 304D of the image.

In the system 300A, the scaler object 222, the format converter object 224 and the flip/rotator object 226 may, for example, perform their respective transforms non-natively on the image (i.e. they may resample, down-sample and/or lose image quality), as discussed above, at least in some cases. Also, the transforms, the order of the transforms and the number of realizations applied, to the system 300A, as discussed above, are for illustrative purposes only. In alternative embodiments the transforms, the order of the transforms and the number of realizations applied to the system 300A may vary. Also, each realization need not be processed separately, as the discussion above was merely illustrative, multiple realizations may be simultaneously processed. In alternative embodiments, multiple images 202 and multiple process commands 206 may also be received.

FIG. 3B is a block diagram of a system 300B in which an image is processed to provide multiple realization according to another example embodiment. System 300B may include an image 202 and a process command 206 being received by a decoder object 220. System 300B (FIG. 3B) may be very similar to system 300A (FIG. 3A), and the differences between the two figures will be described. The image 202 may be a file with an acceptable file type 203 and/or may be any image or several images in any compatible image format 205, as discussed above. The process command 206 as discussed above may include a transforms value 210 and realizations value 212. The process command 206 may indicate for example how many realizations to output of the image 202, which transforms to perform for each realization and in what order to perform the transform(s).

The decoder object 220 may include, for example, an image memory 302, a native flip/rotator object 306, and a native format converter object 308. In the system 300B however the native flip/rotator object 306 and the native format converter object 308 may perform a flip/rotator transform and a format converter transform on the image 202, respectively, rather than the flip/rotator object 226 and the format converter object 224 performing their respective transforms. Thus, in this example, a native flip/rotator object 306 and a native format converter object 308 are available, and may be used to process the image instead of the non-native objects 226 and 224, respectively. In the system 300B, if a native object is available to perform a transform on an image 202 then the native object may be preferably used rather than the non-native object. Then, for example, the processed image may be passed through (or bypass) the non-native object for which native object is available, for example. Therefore, the four realizations 304E, 304F, 304G and 304H may be generated based on native objects, non-native objects or a combination of native and non-native objects, in order to generate multiple realizations in accordance with the process command.

As in the system 300A, the scaler object 222, the format converter object 224, and the flip/rotator object 226, and/or other objects of the system 300B may be organized in series, in parallel or in a combination of both based on the process command 206. For example, the process command may 206 include a command to produce four realizations (304E-H). The request or process command for realizations 304E-H may be, for example, the same process command as for realizations 304A-D (FIG. 3A), but the system 300B may advantageously use one or more native objects to perform image processing and generate the multiple requested realizations. First realization 304E may be generated using a native decoder 220, a non-native scaler object 222, since no native scaler object may be available (although it may be available in an alternative embodiment). However, second realization 304F may be generated using a native decoder 220, a non-native scaler object 222 (e.g., since no native scaler object is available), and a native format converter object 308. Because a native format converter object 308 is available to perform the requested format conversion, native format converter 308 may be used instead of the instantiated non-native format converter object 224 to generate the second image realization 304F. In an example embodiment, however, any native transforms may typically be performed prior to non-native transforms. For example, to produce realization 304F, native format converter object 308 may be performed prior to non-native scaler object 222.

Likewise, a third realization 304G may be generated using a native decoder object 220 and a native flip/rotator object 306. The native flip/rotator object 306 may be used in this example instead of a non-native flip/rotator object 226. A fourth image realization 404H may also be generated using all native objects, including a native decoder object 220, a native format converter object 308, and a native flip/rotator object 306. The native objects 308 and 306, when present or available, may be used instead of the corresponding non-native objects 224 and 226, respectively. For example, after the image is processed by decoder object 220 (including being processed by native objects 306 and 308), the processed image may be passed through non-native objects 224 and 226 without processing (since the format conversion and rotation was already performed by native format converter 308 and native flip/rotator object 306). As noted, the use of native objects, when available, may provide the requested processing natively, e.g., without resampling the image and/or loss of quality, in some cases.

In this manner, according to an example embodiment, multiple realizations of an image may be generated and provided, rather than only a single realization. Also, the generation and output of the multiple realizations may use native objects to perform the transforms or image processing to improve the quality of the output images or realizations.

In alternative embodiments the transforms, the order of the transforms and the number of realizations applied to the system 300B may vary. Also, each realization need not be processed separately, as discussion above was merely illustrative, multiple realizations may be simultaneously processed. In alternative embodiments, multiple images 202 and multiple process commands 206 may also be used.

Figure 3:
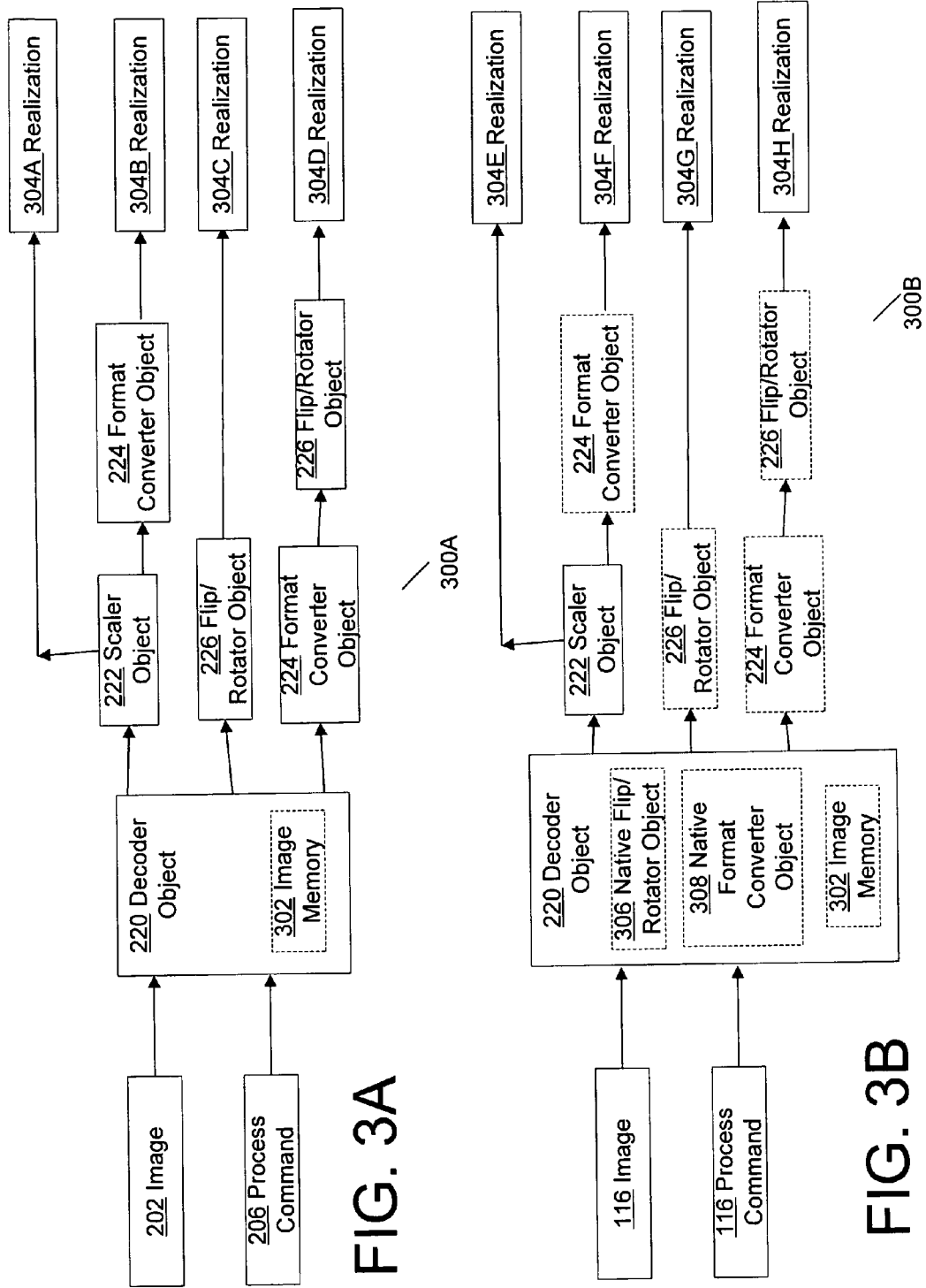
FIG. 3A is a diagram of a system 300A in which an image is processed to provide multiple realizations according to an example embodiment.
FIG. 3B is a block diagram of a system 300B in which an image is processed to provide multiple realizations according to another example embodiment.
Figure 4:
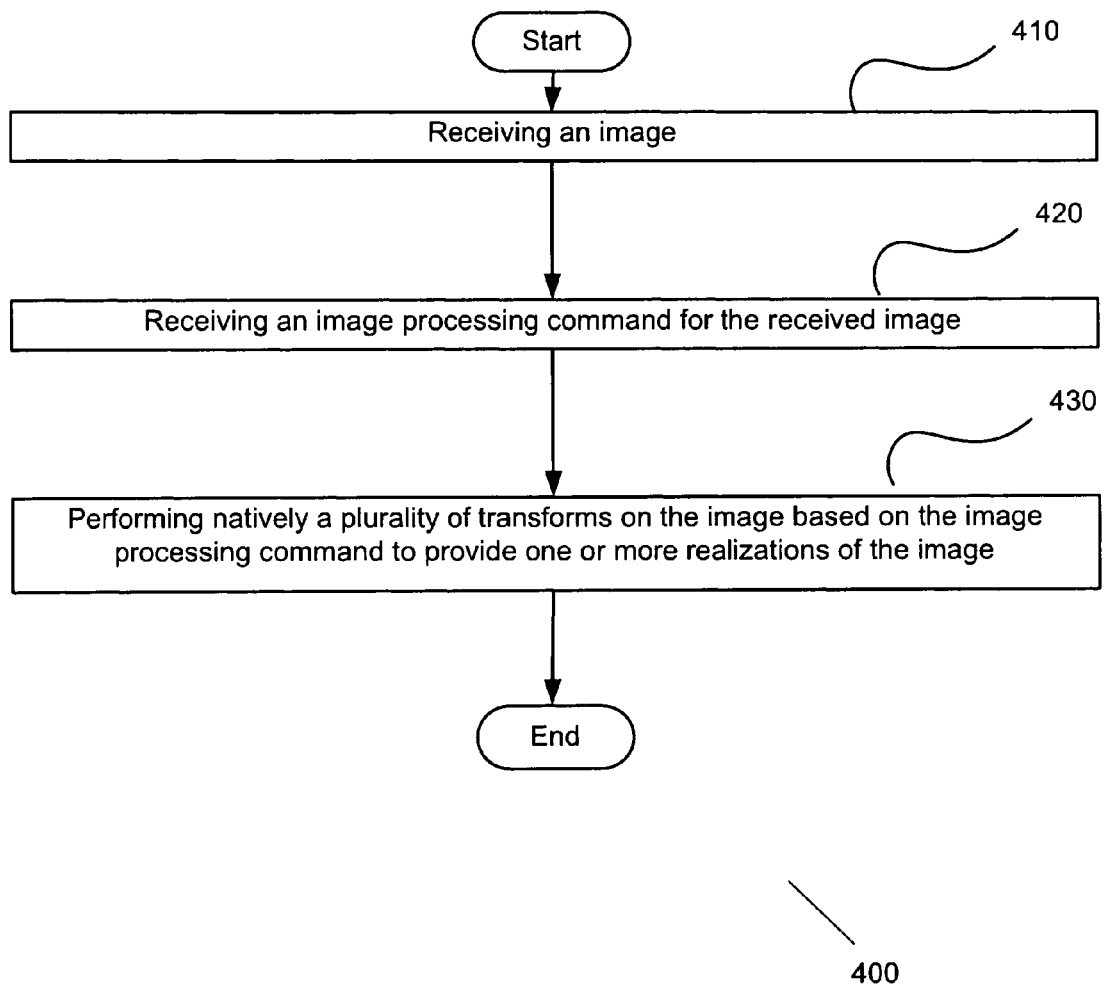
FIG. 4 is a flow chart illustrating a process for performing a plurality of transforms on an image to produce one or more realizations, according to an example embodiment.
Figure 5:
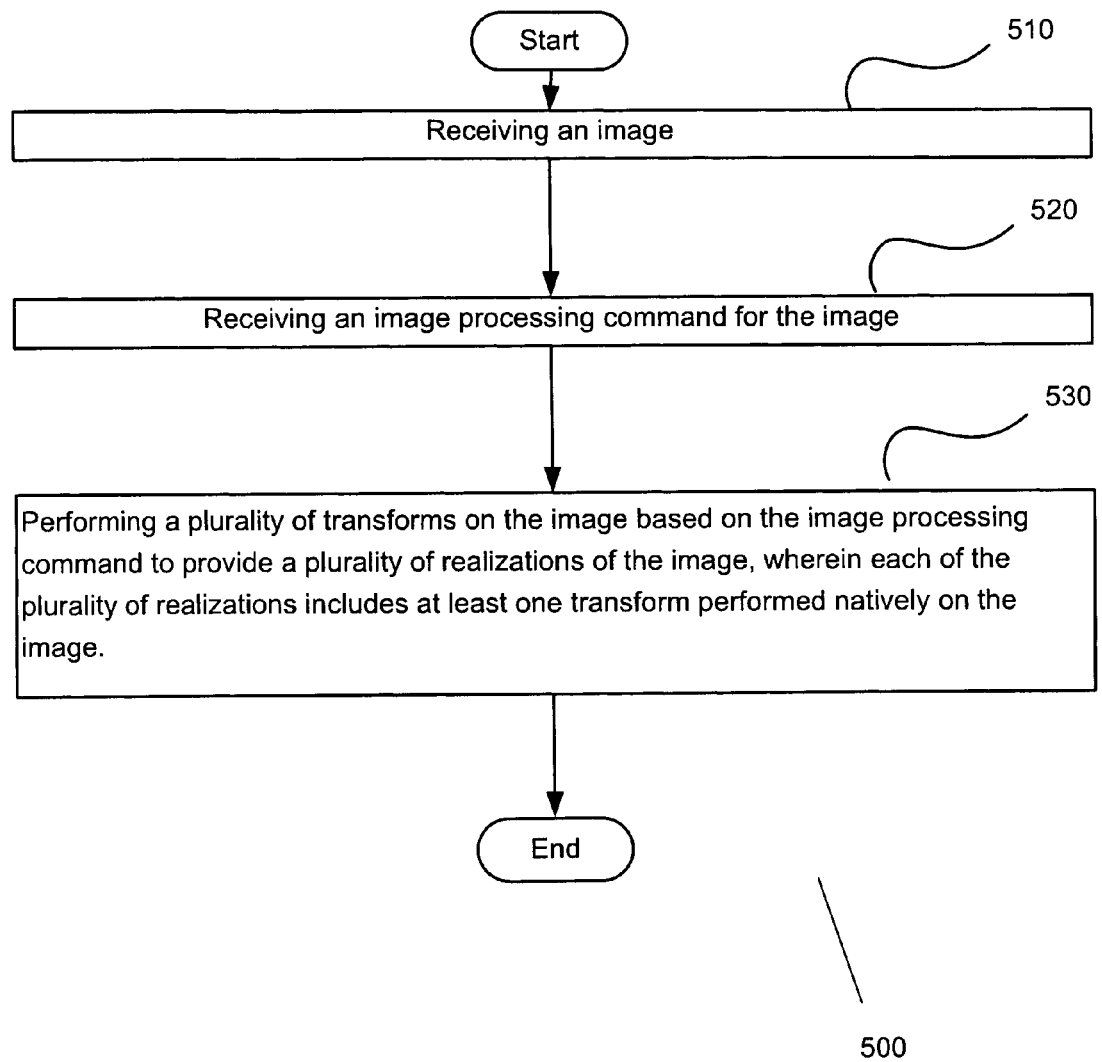
FIG. 5 is a flow chart illustrating a process for performing a plurality of transforms to produce one or more realizations according to another example embodiment.
Figure 6:
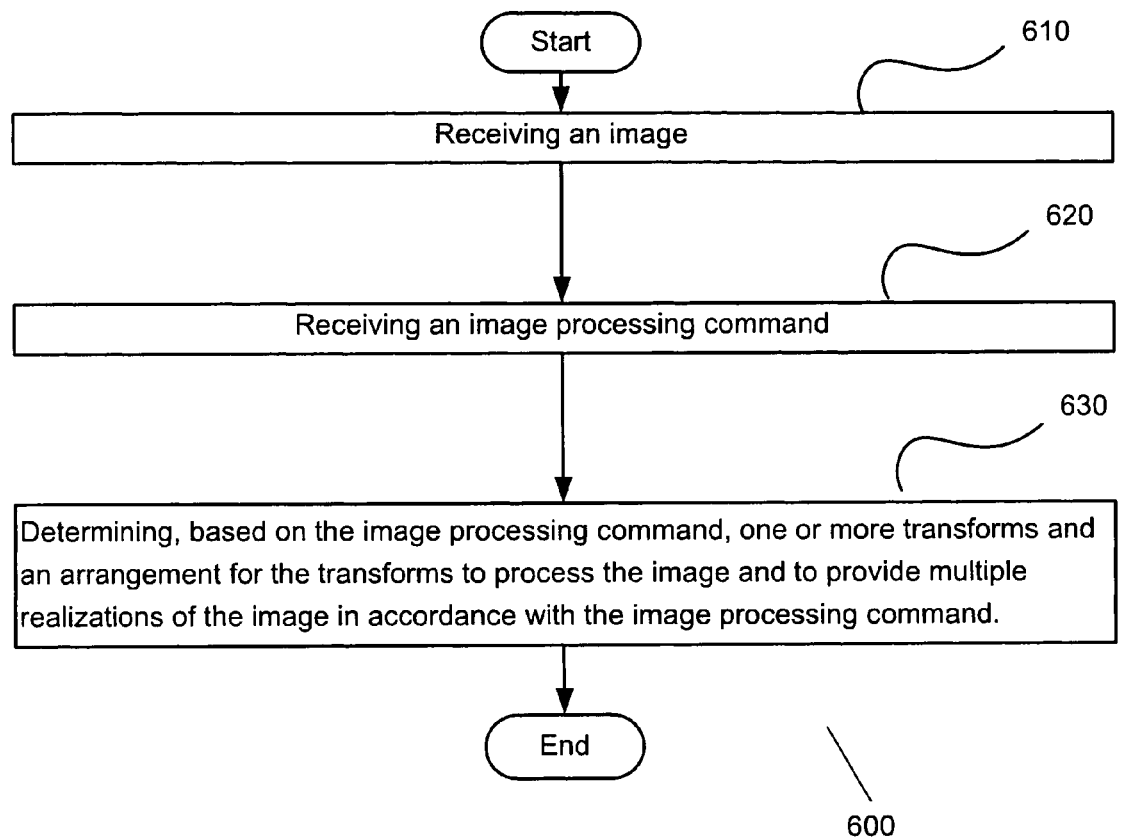
FIG. 6 is a flow chart illustrating a process for performing one or more transforms on an image to produce one or more realizations according to yet another example embodiment.

FIGS. 4-6 include various examples of operational flows or flow charts, with respect to the above-described examples of FIGS. 1, 2, and 3, and/or with respect to other examples and contexts. However, it should be understood that the operational flows may be executed in a number of other environments and contexts, and/or in modified versions of FIGS. 1, 2, and 3. Also, although the various operational flows are presented in the sequence(s) illustrated, it should be understood that the various operations may be performed in other orders than those which are illustrated, or may be performed concurrently.

FIG. 4 is a flow chart illustrating a process for performing a plurality of transforms on an image to produce one or more realizations, according to an example embodiment. After a start operation, the operational flow 400 moves to a receiving operation 410 in which an image may be received. For example, the image processor 118 may receive the image 202 from the application 116. In another example embodiment, the application 116 and the image processor 118 may be part of the same overall system 200, application, or device, although not required.

Then in receiving operation 420, an image processing command (or process command) may be received for the image. For example, as shown in FIG. 2, image processor 118 may receive a process command 206 from the application 116. The process command 206 may be associated with the image 202 and indicate how to process the image 202. The process command 206, for example, may include a transforms value 210 and/or a realizations value 212, although this is merely one example embodiment.

Then in performing operation 430, a plurality of transforms may be performed natively on the image based on the image processing command or process command to provide one or more realizations of the image. For example, as shown in FIG. 2, based on the process command 206, the image processor 118 may perform the transforms on the image 202 to provide the realization(s) 216, 218 of the processed image(s) 214. Or, as show in FIG. 3B, the image 202 and process command 206 may be received by the decoder 220, and after performing a plurality of transforms, natively with the native flip/rotator object 306 and the native format converter object 308, for example, one or more realizations may be provided, including realizations 304G and 304H.

FIG. 5 is a flow chart illustrating a process for performing a plurality of transforms according to an example embodiment. After a start operation, the operational flow 500 moves to a receiving operation 510 in which an image may be received. For example, the image processor 118 may receive the image 202 from the application 116.

Then in receiving operation 520, an image processing command (or process command) may be received for the image. For example, as shown in FIG. 2, the process command 206 may be received from application 116 by the image processor 118. The process command 206 may be associated with the image 202 and indicate how to process the image 202, and may identify one or more realizations of the image to be provided or generated.

Then in performing operation 530, a plurality of transforms may be performed on the image based on the image processing command to provide a plurality of realizations. Each of the plurality of realizations may include at least one transform performed natively on the image. For example, as shown in FIG. 3B, the image 202 and process command 206 may be received by the decoder 220. After decoder object 220 decodes the image, a format converter transform may be performed by the native format converter object 308, and then a non-native scaler transform performed by the non-native scaler 222 to produce the second realization 304F. Alternatively, the native format conversion performed by native format converter object 308 may be be performed at the same time the image is decoded by decoder 220. As discussed above, native transforms may be performed prior to non-native transforms. In an example embodiment, native transforms may typically be performed in any order, but typically prior to non-native transforms. The non-native transforms may also typically be performed in any order. Also, to produce the third realization 304G, the image may be decoded by decoder object 220, and then, or at the same time, a rotation transform may be performed on the image by the native flip/rotator object 306, for example. Thus, in this manner, as an example, multiple realizations may be provided, with each of the realizations including at least one native transform performed on the image to generate the realization.

FIG. 6 is a flow chart illustrating a process for performing one or more transforms on an image to produce one or more realizations according to yet another example embodiment. After a start operation, the operational flow 600 moves to a receiving operation 610 in which an image may be received. Then in receiving operation 620, an image processing command may be received.

Then in determining operation 630, based on the image processing command (or process command), one or more transforms and an arrangement for the transforms may be determined to process the image and to provide multiple realizations of the image in accordance with the image processing command. For example, based on an image process command, one or more transforms (or objects) may be determined. In addition, an arrangement, such as a series and/or parallel arrangement of the transforms or objects may be determined to process the image in order to process the image and generate the realizations of the image in accordance with the image processing command. For example, in FIG. 3A, this may include determining a series arrangement of a scaler object 222 and a format converter object 224 (after decoder object 220) to process the image in order to produce the requested realization 304B of the received image 202. Likewise, this determination may include determining a parallel arrangement and an order of transforms or objects to process the received image to produce other requested realizations, such as 304A, 304C and 304D, for example.

While certain features of the described implementations have been illustrated as described herein, many modifications, substitutions, changes and equivalents may now occur to those skilled in the art. It is, therefore, to be understood that the appended claims are intended to cover all such modifications and changes as fall within the true spirit of the various embodiments.

What is claimed is:

1. A method comprising at least the following steps implemented by a computing device or an image processor device:
    receiving an image, wherein the image is electronic;
    receiving an image processing command for the received image, wherein the image processing command specifies a particular transform to be performed on the image, wherein a native and a non-native transform can each perform the same functionality of the particular transform, wherein each native transform operates on a non-down-sampled version of the image and is performed during decoding of the image and each non-native transform operates on a down-sampled version of the image and is performed after decoding of the image, and wherein the particular transform does not include compressing or decompressing the image;
    selecting the native transform over the non-native transform in response to the image processing command; and
    performing a plurality of transforms, including the native transform instead of the non-native transform, on the image based on the image processing command to concurrently provide one or more realizations of the image.

2. The method of claim 1 wherein the receiving an image comprises:
 receiving a file comprising at least one of a raster graphics image, a digital image and a bitmap image.

3. The method of claim 1 wherein the receiving an image processing command comprises:
 receiving an image processing command to perform one or more of the following transforms to the image: scaling the image, converting a format of the image to a different format and flipping or rotating the image.

4. The method of claim 1 wherein the performing comprises:
 performing natively a first transform by a decoder on the image based on the image processing command; and
 performing natively by the decoder a second transform on the image based on the image processing command.

5. The method of claim 1 wherein the performing comprises:
 performing, without re-sampling the image, a plurality of transforms on the image based on the image processing command to provide one or more realizations of the image.

6. The method of claim 1 wherein the performing comprises:
 instantiating a decoder object;
 instantiating an object for one or more transforms; and
 associating the object for the one or more transforms with the decoder object.

7. The method of claim 6 wherein the instantiating an object for one or more transforms comprises:
 instantiating a scaler object;
 instantiating a format converter object; or
 instantiating a flip/rotator object to perform at least one of a flip and rotate transform.

8. The method of claim 1 wherein the performing further comprises:
 storing state information identifying a state of the image being processed.

9. The method of claim 1 wherein the performing further comprises:
 storing one or more intermediate stage image realizations after one or more of the transforms are performed on the image.

10. The method of claim 1 wherein the performing comprises:
 performing natively a plurality of transforms on the image based on the image processing command to provide a plurality of realizations of the image.

11. A method comprising at least the following steps implemented by a computing device or an image processor device:
 receiving an image, wherein the image is electronic;
 receiving an image processing command for the image, wherein the image processing command specifies a particular transform to be performed on the image, wherein a native transform and a non-native transform can each perform the same functionality of the particular transform, wherein each native transform operates on a non-down-sampled version of the image and is performed during decoding of the image and each non-native transform operates on a down-sampled version of the image and is performed after decoding of the image, and wherein the particular transform does not include compressing or decompressing the image;
 selecting the native transform over the non-native transform in response to the image processing command; and
 performing a plurality of transforms, including the native transform instead of the non-native transform, on the image based on the image processing command to concurrently provide a plurality of realizations of the image.

12. The method of claim 11 wherein the receiving an image processing command comprises:
 receiving an image processing command to perform one or more of the following transforms to the image: scaling the image, converting a format of the image to a different format and flipping or rotating the image.

13. The method of claim 11 wherein the performing comprises:
 instantiating a decoder object;
 instantiating an object for one or more transforms; and
 associating the object for the one or more transforms to the decoder object.

14. The method of claim 11 wherein the performing further comprises:
 storing one or more intermediate stage image realizations after one or more of the transforms are performed on the image to concurrently provide the plurality of realizations of the image.

15. The method of claim 11 wherein the performing comprises instantiating an object to perform each of a plurality of transforms, the instantiating including one or more of:
 instantiating a decoder object;
 instantiating a scaler object;
 instantiating a format converter object; or
 instantiating a flip/rotator object to perform at least one of a flip and rotate transform.

16. The method of claim 11 wherein the performing comprises:
 performing a plurality of transforms on the image based on the image processing command to concurrently provide a plurality of realizations of the image, the plurality of realizations including an original or unprocessed image and one or more processed or transformed image realizations.

17. The method of claim 11 wherein the performing comprises:
 concurrently outputting the plurality of realizations of the image.

18. A method comprising at least the following steps implemented by a computing device or an image processor device:
 receiving an image, wherein the image is electronic;
 receiving an image processing command, wherein the image processing command specifies a particular transform to be performed on the image, wherein a native transform and a non-native transform can each perform the same functionality of the particular transform, wherein each native transform operates on a non-resampled version of the image and is performed during decoding of the image and each non-native transform operates on a resampled version of the image and is performed after decoding of the image, and wherein the particular transform does not include compressing or decompressing the image;
 determining, based on the image processing command, one or more transforms and an arrangement for the transforms to process the image and to concurrently provide multiple realizations of the image in accordance with the image processing command, wherein the determining selects only one of the native transform and the non-native transform to perform the particular transform;

performing the one or more transforms on the image in at least one of an order and arrangement based on the determining; and concurrently providing the multiple realizations resulting from the performing, wherein the multiple realizations comprise realizations of versions of the image both before and after application of at least one of the one or more transforms.

19. The method of claim 18 wherein the determining comprises:

determining, based on the image processing command, one or more transforms and at least one of a serial and parallel arrangement or order of the transforms to process the image and to concurrently provide multiple realizations of the image in accordance with the image processing command.

20. The method of claim 18, wherein the multiple realizations comprise at least one intermediate stage realization after at least one but not all of the one or more transforms are performed, and at least one final stage realization after all of the one or more transforms are performed.

* * * * *